United States Patent
Zitnick, III et al.

(10) Patent No.: US 7,206,000 B2
(45) Date of Patent: *Apr. 17, 2007

(54) SYSTEM AND PROCESS FOR GENERATING A TWO-LAYER, 3D REPRESENTATION OF A SCENE

(75) Inventors: Charles Zitnick, III, Seattle, WA (US); Richard Szeliski, Redmond, WA (US); Sing Bing Kang, Redmond, WA (US); Matthew Uyttendaele, Seattle, WA (US); Simon Winder, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/334,591

(22) Filed: Jan. 17, 2006

(65) Prior Publication Data

US 2006/0114253 A1 Jun. 1, 2006

Related U.S. Application Data (63) Continuation of application No. 10/879,235, filed on Jun. 28, 2004, now Pat. No. 7,015,926.

(51) Int. Cl.
*G09G 5/02* (2006.01)

(52) U.S. Cl. ............ 345/592; 345/597; 345/598; 345/617; 345/599; 345/629

(58) Field of Classification Search ............... 345/592, 345/597, 598, 599, 617, 629
See application file for complete search history.

(56) References Cited

U.S. PATENT DOCUMENTS 6,661,918 B1 * 12/2003 Gordon et al. ............ 382/173
2005/0232509 A1 * 10/2005 Blake et al. ............... 382/275

\* cited by examiner

*Primary Examiner*—Matthew C. Bella
*Assistant Examiner*—Mike Rahmjoo
(74) *Attorney, Agent, or Firm*—Lyon & Harr, LLP; Richard T Lyon (57) ABSTRACT

A system and process for generating a two-layer, 3D representation of a digital or digitized image from the image and a pixel disparity map of the image is presented. The two layer representation includes a main layer having pixels exhibiting background colors and background disparities associated with correspondingly located pixels of depth discontinuity areas in the image, as well as pixels exhibiting colors and disparities associated with correspondingly located pixels of the image not found in these depth discontinuity areas. The other layer is a boundary layer made up of pixels exhibiting foreground colors, foreground disparities and alpha values associated with the correspondingly located pixels of the depth discontinuity areas. The depth discontinuity areas correspond to prescribed sized areas surrounding depth discontinuities found in the image using a disparity map thereof.

4 Claims, 4 Drawing Sheets

SYSTEM AND PROCESS FOR GENERATING A TWO-LAYER, 3D REPRESENTATION OF A SCENE

BACKGROUND

1. Technical Field

The invention is related to layered representations of digital or digitized images, and more particularly to a system and process for generating a two-layer, 3D representation of a scene.

2. Background Art

For several years now, viewers of TV commercials and feature films have been seeing the "freeze frame" effect used to create the illusion of stopping time and changing the camera viewpoint. The earliest commercials were produced by using a film-based system, which rapidly jumped between different still cameras arrayed along a rail to give the illusion of moving through a frozen slice of time.

When it first appeared, the effect was fresh and looked spectacular, and soon it was being emulated in many productions, the most famous of which is probably the "bullet time" effects seen in the movie entitled "The Matrix". Unfortunately, this effect is a one-time, pre-planned affair. The viewpoint trajectory is planned ahead of time, and many man hours are expended to produce the desired interpolated views. Newer systems are based on video camera arrays, but still rely on having many cameras to avoid software view interpolation.

Thus, existing systems would not allow a user to interactively change to any desired viewpoint while watching a dynamic image-based scene. Most of the work on image-based rendering (IBR) in the past involves rendering static scenes, with two of the best-known techniques being Light Field Rendering [11] and the Lumigraph [7]. Their success in high quality rendering stems from the use of a large number of sampled images and has inspired a large body of work in the field. One exciting potential extension of this groundbreaking work involves interactively controlling viewpoint while watching a video. The ability of a user to interactively control the viewpoint of a video enhances the viewing experience considerably, enabling such diverse applications as new viewpoint instant replays, changing the point of view in dramas, and creating "freeze frame" visual effects at will.

However, extending IBR to dynamic scenes is not trivial because of the difficulty (and cost) of synchronizing so many cameras as well as acquiring and storing the images. Not only are there significant hurdles to overcome in capturing, representing, and rendering dynamic scenes from multiple points of view, but being able to do this interactively provides a significant further complication. To date attempts to realize this goal have not been very satisfactory.

In regard to the video-based rendering aspects of an interactive viewpoint video system, one of the earliest attempts at capturing and rendering dynamic scenes was Kanade et al's Virtualized Reality system [10], which involved 51 cameras arranged around a 5-meter geodesic dome. The resolution of each camera is 512×512 and the capture rate is 30 fps. They extract a global surface representation at each time frame, using a form of voxel coloring [14] based on the scene flow equation [17]. Unfortunately, the results look unrealistic because of low resolution, matching errors, and improper handling of object boundaries.

Carranza et al. [3] used seven synchronized cameras distributed around a room looking towards its center to capture 3D human motion. Each camera is at CIF resolution (320×240) and captures at 15 fps. They use a 3D human model as a prior to compute 3D shape at each time frame.

Yang et al. [18] designed an 8×8 grid of cameras (each 320×240) for capturing a dynamic scene. Instead of storing and rendering the data, they transmit only the rays necessary to compose the desired virtual view. In their system, the cameras are not genlocked; instead, they rely on internal clocks across six PCs. The camera capture rate is 15 fps, and the interactive viewing rate is 18 fps.

Common to the foregoing systems is that a lot of images are required for realistic rendering, partially because the scene geometry is either unknown or known to only a rough approximation. If geometry is known accurately, it is possible to reduce the requirement for images substantially [7]. One practical way of extracting the scene geometry is through stereo, and a lot of stereo algorithms have been proposed for static scenes [13]. However, there have been a few attempts at employing stereo techniques with dynamic scenes. As part of the Virtualized Reality work [10], Vedula et al. [17] proposed an algorithm for extracting 3D motion (i.e., correspondence between scene shape across time) using 2D optical flow and 3D scene shape. In their approach, they use a voting scheme similar to voxel coloring [14], where the measure used is how well a hypothesized voxel location fits the 3D flow equation.

Zhang and Kambhamettu [19] also integrated 3D scene flow and structure in their framework. Their 3D affine motion model is used locally, with spatial regularization, and discontinuities are preserved using color segmentation. Tao et al. [16] assume the scene is piecewise planar. They also assume constant velocity for each planar patch in order to constrain the dynamic depth map estimation.

In a more ambitious effort, Carceroni and Kutulakos [2] recover piecewise continuous geometry and reflectance (Phong model) under non-rigid motion with known lighting positions. They discretize the space into surface elements ("surfels"), and perform a search over location, orientation, and reflectance parameter to maximize agreement with the observed images.

In an interesting twist to the conventional local window matching, Zhang et al. [20] use matching windows that straddle space and time. The advantage of this method is that there is less dependence on brightness constancy over time.

Active rangefinding techniques have also been applied to moving scenes. Hall-Holt and Rusinkiewicz [8] use projected boundary-coded stripe patterns that vary over time. There is also a commercial system on the market called ZCam™ manufactured by 3DV Systems of Israel, which is a range sensing video camera add-on used in conjunction with a broadcast video camera. However, it is an expensive system, and provides single viewpoint depth only, which makes it less suitable for multiple view-point video.

However, despite all the advances in stereo and image-based rendering, it is still very difficult to render high-quality, high resolution views of dynamic scenes. One approach, as suggested in the Light Field Rendering paper [11], is to simply resample rays based only on the relative positions of the input and virtual cameras. As demonstrated in the Lumigraph [7] and subsequent work, however, using a 3D impostor or proxy for the scene geometry can greatly improve the quality of the interpolated views. Another approach is to create a single texture-mapped 3D model [10], but this generally produces inferior results to using multiple reference views. Yet another approach employs a geometry-assisted image-based rendering approach that requires a 3D proxy. One possibility is to use a single global polyhedral model, as in the Lumigraph and Unstructured Lumigraph papers [1]. Another possibility is to use per-pixel depth, as in Layered Depth Images [15], offset depth maps in Facade [5], or sprites with depth [15]. In general, using different local geometric proxies for each reference view [12, 6, 9] produces higher quality results.

However, even multiple depth maps still exhibit rendering artifacts when generating novel views, i.e., aliasing (jaggies) due to the abrupt nature of the foreground to background transition and contaminated colors due to mixed pixels, which become visible when compositing over novel backgrounds or objects.

This problem is addressed in the present invention via a unique two-layer, 3D representation of input images. It is noted that not only can this two-layer, 3D representation be used to resolve the foregoing aliasing problem in connection with rendering novel views in an interactive viewpoint video system, but can also be employed advantageously in other contexts as well. In general, any digital or digitized image can be represented using this two-layer, 3D representation.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for generating a two-layer representation of a digital or digitized image. In general, the two layers include a main layer having pixels exhibiting background colors and background disparities associated with correspondingly located pixels of depth discontinuity areas in the image as well as pixels exhibiting colors and disparities associated with correspondingly located pixels of the image not found in these depth discontinuity areas. The other layer is a boundary layer made up of pixels exhibiting foreground colors, foreground disparities and alpha values associated with the correspondingly located pixels of the depth discontinuity areas. The depth discontinuity areas correspond to prescribed sized areas surrounding depth discontinuities found in the image.

This two layer representation is generated by first identifying the location of depth discontinuities in the image under consideration using a disparity map of the image. Depth discontinuities occur at locations where a difference in disparity values between adjacent pixels is more than a prescribed number of levels. The pixels of the image that are found within prescribed sized areas surrounding the depth discontinuities are then identified. The foreground and background colors, along with foreground alpha values, are next estimated for each pixel in these depth discontinuity areas using a matting technique. In addition, foreground and background disparity values are estimated for each pixel in the depth discontinuity areas using alpha-weighted averages of nearby disparities in the foreground and background portions of the image. Then, a boundary layer of the image is established that includes a pixel at each location that corresponds to a pixel of the depth discontinuity areas. The foreground color, foreground disparity and alpha value associated with the corresponding pixel of the depth discontinuity areas are then assigned to each boundary layer pixel.

Additionally, a main layer of the image is established. This main layer includes a pixel at each location that corresponds to a pixel of the depth discontinuity areas, as well as a pixel at each pixel location of the image that does not correspond to a pixel of the depth discontinuity areas. The background color and background disparity value associated with the corresponding pixel of the depth discontinuity areas is assigned to each of the correspondingly located pixels in the main layer, while the color and disparity values associated with the pixels of the image not in the depth discontinuity areas are assigned to each of the correspondingly located pixels in the main layer. It is noted that, once the foreground colors, foreground disparities and alpha values have been established for each pixel of the depth discontinuity areas, the size of these areas can be grown by a prescribed amount using conventional dilation techniques to prevent cracks from appearing during the rendering of the image from the layers.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 4(a)–(e) are images showing the results of the applying the two-layer image representation generation process of FIGS. 3A–B on an image of a group of breakdancers. FIG. 4(e) represents the boundary layer alpha estimates. It is noted that the images of FIGS. 4(c)–(e) are shown negated so that the transparent/empty pixels look white.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
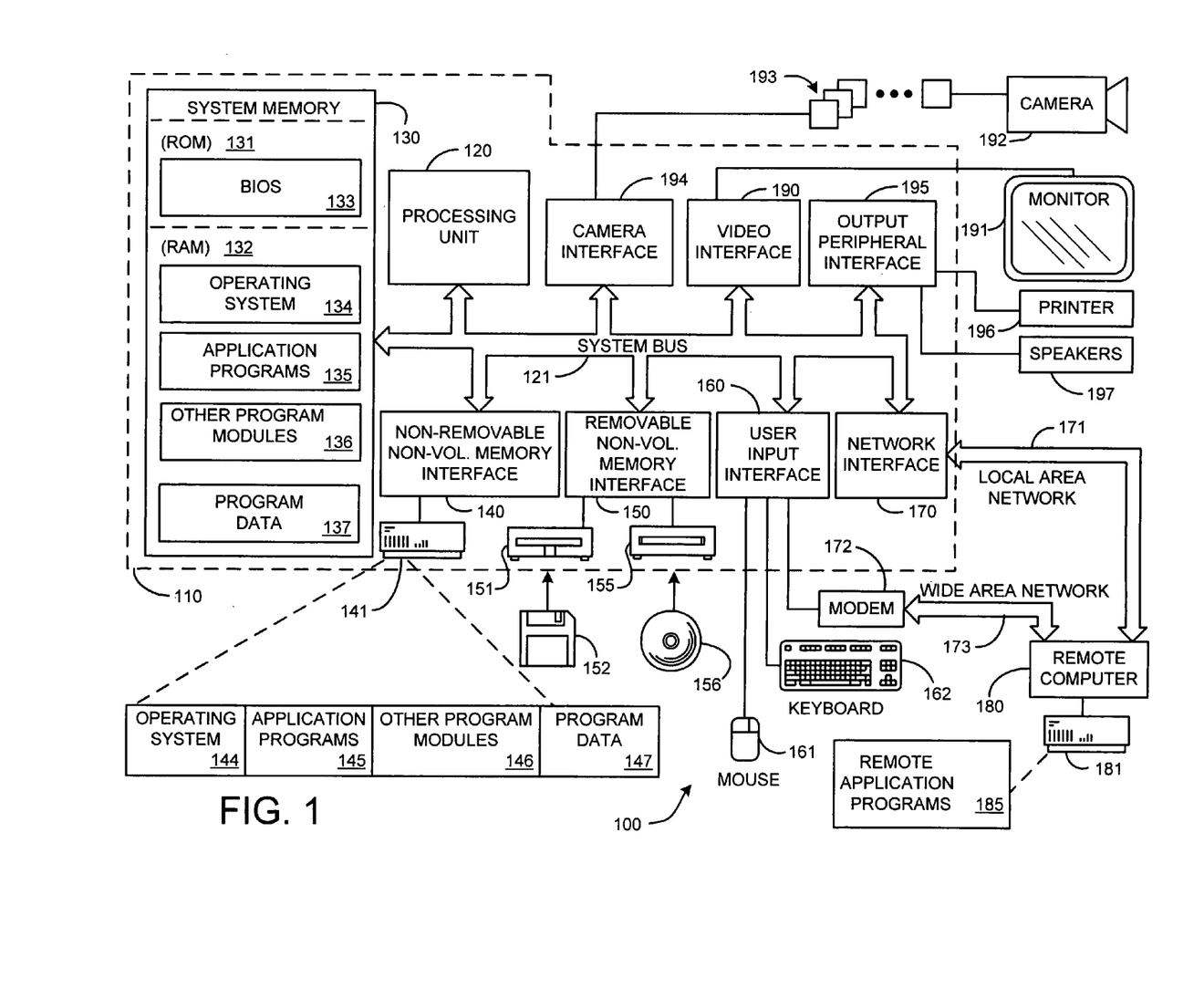
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Two-Layer Image Representation

The exemplary operating environment having now been discussed, the remaining part of this description section will be devoted to a description of the program modules embodying the invention. Generally, the present invention involves generating a unique two-layer, 3D representation of an image which facilitates its compression, transfer and storage. This representation is particularly useful when the image is a frame of a video of a dynamic scene and the frame data is being encoded for real-time rendering. It also includes pixel disparity or depth information thus providing the 3D aspects of the representation. The image or frame is a digital image that is either captured by a digital camera, or if not, digitized prior to performing further processing. It is also noted that the digital image data can image-based in that it is obtained by capturing an actual image of a scene using a camera, or synthesized image data.

The two-layer representation is generated by first locating the depth discontinuities in a disparity map of the image or frame under consideration. These depth discontinuities are defined as any jump greater than a prescribed number of disparity levels (e.g., 4 levels in tested embodiments of the present invention). The disparity map of the image under consideration can be obtained in any conventional manner. However, tested embodiments of the present invention employed a new approach that is the subject of a co-pending application entitled "Color Segmentation-Based Stereo Reconstruction System And Process" by the inventors of this application and assigned to the common assignee. The co-pending application was filed on Jun. 28, 2004 and assigned Ser. No. 10/879,327.

Small areas are next identified in the vicinity of the depth discontinuities found in the image under consideration. These small areas are defined as including all the pixels within 3 pixels of the location of the depth discontinuities. This is illustrated in graph of FIG. 2, where the disparity values of a line of pixels is plotted against the pixel location. The abrupt step in the disparity values represents a depth discontinuity, assuming it is greater than the prescribed number of disparity levels. The aforementioned small area, which will be referred to as the depth discontinuity area, is established around the discontinuity. In the profile view represented in the graph of FIG. 2, this area has a width that straddles the location of the depth disparity in the image. If the depth discontinuity follows the outline of an object in the image, as is typically the case, the depth discontinuity areas will merge to form a strip that follows this outline.

Some pixels along the boundary of objects will receive contributions from both the background and foreground regions. However, if the original mixed pixel colors are used during rendering, visible artifacts can result. Thus, it is important to separate these two contributions. Accordingly, the foreground and background colors of each pixel in the depth discontinuity areas are established next, as is the opacity of the pixels (in the form of alpha values). This is accomplished using a matting technique. In general, matting techniques involve extracting the foreground elements and the background elements of an image by estimating the color and opacity stemming from the foreground and background elements at each pixel. The opacity of a pixel is defined by an alpha value which ranges between 0 and 1. In effect, the alpha value defines the percentage of a pixel's color that is attributable to the foreground element. The net result of a typical matting operation is to identify a foreground color, a background color, and an alpha value for each pixel considered. While any matting procedure can be employed in conjunction with the present invention, tested embodiments used a Bayesian image matting technique described in reference [4]. It is noted that reference [4] contains a description of many of the other existing matting techniques as well.

Figure 2:
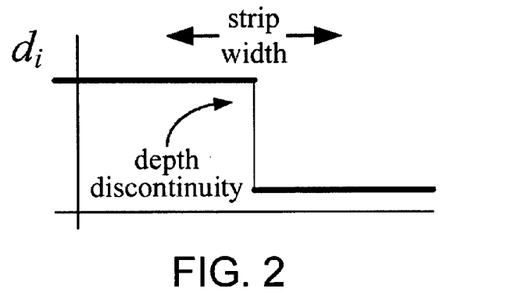
FIG. 2 is a graph plotting the disparity values of a line of pixels against the pixel location, where the abrupt step in the disparity values represents a depth discontinuity.

As described previously, a primary application of the present invention involves rendering virtual images of a scene from viewpoints that are intermediate to the viewpoints associated two actual images of the scene. While the details of how this is accomplished are not within the scope of the present invention, it is noted that the process typically involves knowing the depths associated with each pixel. To this end, the image representation according to the present invention includes pixel depths (or disparity values which can be readily converted to depth values). While these values are available for most pixels from the aforementioned disparity map, it is noted that there are two depths associated with the mixed pixels found adjacent to a depth discontinuity—namely the depth associated with the foreground element and the depth associated with the background. Thus, these foreground and background depth (or disparity) values are estimated next for each of the pixels in the depth discontinuity area. In general, this is accomplished by using alpha-weighted averages of nearby depths in the foreground and background portions of the image, respectively. More particularly, the foreground disparities are found by using an alpha weighted average within a window (e.g., 7×7 pixels) of the disparity values from pixels within the original foreground area of the depth discontinuity area. In FIG. 2, the original foreground area refers to the pixels to the left of the disparity discontinuity. The background disparities are found by a weighted average within a window of the disparity values within the original background area of the depth discontinuity area. The weights used for averaging the background disparities are set equal to one minus the alpha value.

Once the depth discontinuity area pixel colors, disparities, and opacities have been established, the two layers of the image representation are formed. More particularly, the previously-computed foreground color, foreground disparity, and alpha values associated with each respective pixel found within the depth discontinuity areas are assigned to a correspondingly located pixel of the boundary layer of the image. Similarly, the previously-computed background color and background disparity values associated with each respective pixel in the depth discontinuity areas are assigned to a correspondingly located pixel of the main layer of the image, along with the color and disparity values of all the pixels in the image not in the depth discontinuity areas (as taken from the image and its disparity map).

Accordingly, the resulting two-layer image representation includes a boundary layer, which identifies the foreground color, foreground disparity, and alpha value for each pixel in that layer. In addition, the representation includes a main layer, which identifies the background color and background depth of the pixels in that layer associated with the depth discontinuity areas, and the color and disparity value for each other pixel in that layer. Given this, it can be seen that the main layer will include pixel information about every pixel in the image, however, this data will be relatively similar from one image of the scene to the next. This is both true temporally if the images are video frames, and spatially if multiple images of the same scene are being transmitted or stored. This makes the main layer very compressible using standard image compression methods. Additionally, the boundary layer will contain relatively little data, as typically only a small percentage of the total number of pixels in the image will typically be contained in the layer. Thus, even though this data is likely to change significantly from one image of a dynamic scene to the next, as taken over time, there is not that much data that needs to be transmitted or stored. Because of this, even without compression, this data can be readily transmitted or stored. With the use of appropriate compression schemes, the amount of data and the speed at which it can be transferred can be reduced even further. In this way, the foregoing two-layer image representation provides a desired facilitation of data transfer and storage and makes real time rendering feasible.

Figure 3A:
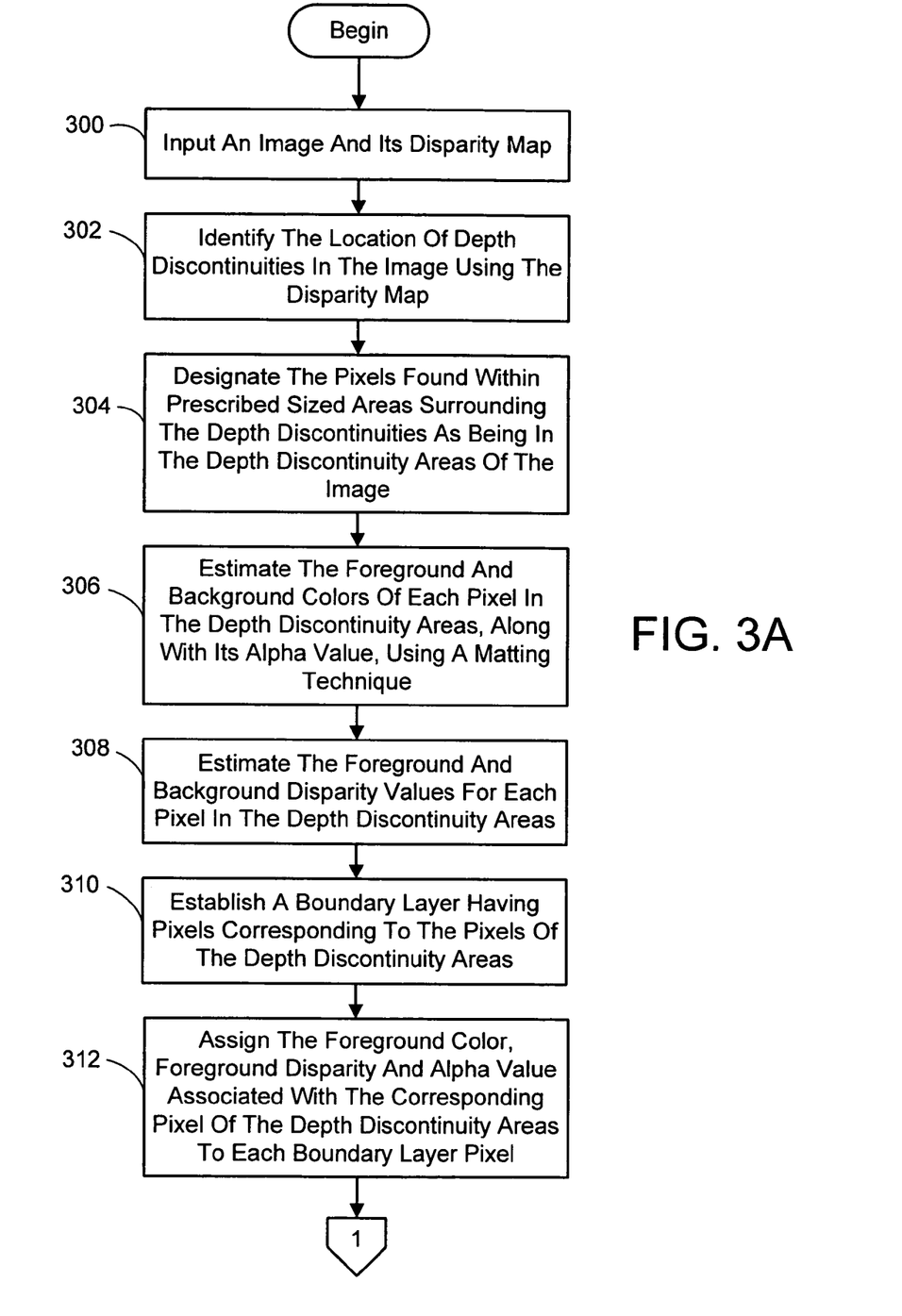
FIGS. 3A and 3B are a flow chart diagramming a process for generating a two-layer representation of a digital or digitized image in accordance with the present invention.
Figure 3B:
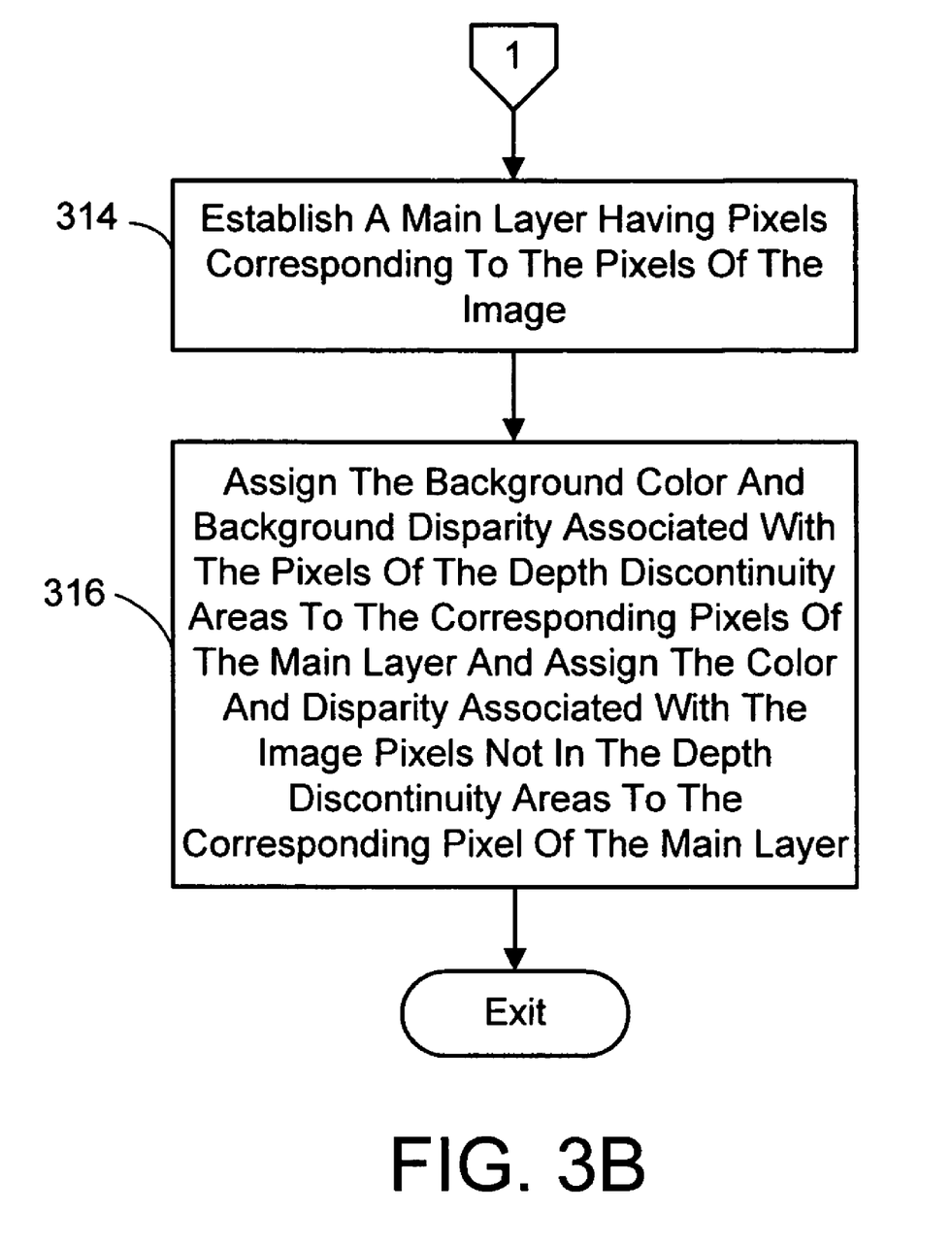

The foregoing two-layer image representation generation process will now be outlined in reference to the flow diagram shown in FIGS. 3A–B. First, the digital or digitized image that is to be represented, and its disparity map, are input (process action 300). The location of depth discontinuities are then identified in the image using the disparity map (process action 302). Next, the pixels found within prescribed sized areas surrounding the depth discontinuities are identified and designated as being in the depth discontinuity areas of the image (process action 304). The foreground and background colors of each pixel in the depth discontinuity areas are established next, along with its alpha value, using a matting technique (process action 306). In addition, in process action 308, a foreground and background disparity value is estimated for each of the pixels in the depth discontinuity areas. A boundary layer is then established, which has pixels corresponding to the pixels of the depth discontinuity areas (process action 310). The foreground color, foreground disparity, and alpha values associated with each respective pixel found within the depth discontinuity areas are assigned to the corresponding pixel of the boundary layer (process action 312). A main layer is also established, which has pixels corresponding to all the pixels of the image (process action 314). In this case, the background color and background disparity associated with the pixels of the depth discontinuity areas are assigned to the corresponding pixels of the main layer, and the color and disparity associated with the image pixels not in the depth discontinuity areas are assigned to the corresponding pixel of the main layer (process action 316).

One improvement that can be incorporated into the foregoing process for generating the two-layer image representation according to the present invention involves dilating the foreground matte of the depth discontinuity areas prior to forming the boundary and main layers of the image representation. This has the advantage of preventing cracks from appearing during the rendering of the image from the layers, as could occur due to inaccuracies in the process. More particularly, once the foreground colors, foreground disparities and alpha values have been established for each pixel of the depth discontinuity areas, the size of these areas is grown by a prescribed amount (e.g., 1 pixel). The new pixels added to the boundary layer during dilation are assigned the same color and disparity values as the corresponding pixel in the main layer, and an alpha value of 1.

Figure 4A:
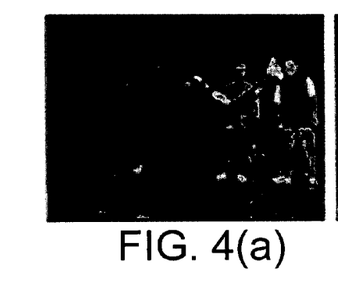
FIG. 4(a) show the main layer color estimates and FIG. 4(b) represents the main layer disparity estimates.
Figure 4B:
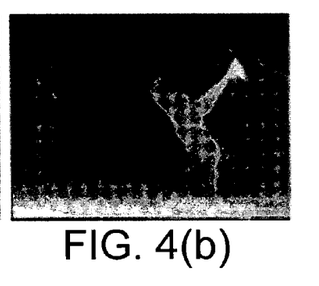
Figure 4C:
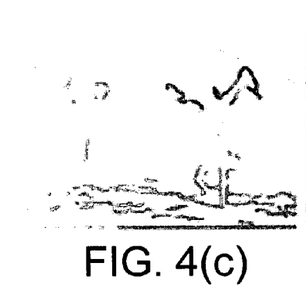
FIG. 4(c) shows the boundary layer color estimates and FIG. 4(d) represents the boundary layer disparity estimates.
Figure 4D:
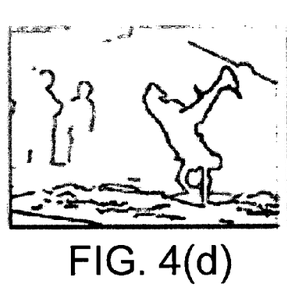
Figure 4E:
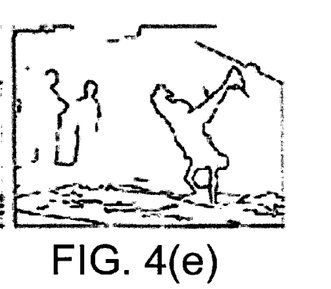

FIGS. 4(a)–(e) show the results of the applying the two-layer image representation generation process in accordance with the present invention on an image of a group of breakdancers. FIG. 4(a) shows the main layer color estimates and FIG. 4(b) represents the main layer disparity estimates. Similarly, FIG. 4(c) shows the boundary layer color estimates and FIG. 4(d) represents the boundary layer disparity estimates. Finally, FIG. 4(e) represents the boundary layer alpha estimates. It is noted that the images of FIGS. 4(c)–(e) are shown negated so that the transparent/empty pixels look white. Notice how only a small amount of information needs to be transmitted to account for the soft object boundaries, and how the boundary layer opacities and the colors in both layers are cleanly recovered.

It is noted that throughout the foregoing description, the disparity values of the image pixels was used. However, at any point in the generation process these values could be converted to depth values using standard methods. In that case, the main and boundary layer would include depth values rather than disparity values for the pixel contained therein.

3.0 REFERENCES

[1] Buehler, C., Bosse, M., McMillan, L., Gortler, S. J., and Cohen, M. F. 2001. Unstructured Lumigraph rendering. *Proceedings of SIGGRAPH* 2001 (August), 425–432.

[2] Carceroni, R. L., and Kutulakos, K. N. 2001. Multi-view scene capture by surfel sampling: From video streams to non-rigid 3D motion, shape and reflectance. In *Eighth International Conference on Computer Vision (ICCV* 2001), vol. II, 60–67.
[3] Carranza, J., Theobalt, C., Magnor, M. A., and Seidel, H.-P. 2003. Free-viewpoint video of human actors. *ACM Transactions on Graphics* 22, 3 (July), 569–577.
[4] Chuang, Y.-Y., et al. 2001. A Bayesian approach to digital matting. In *Conference on Computer Vision and Pattern Recognition (CVPR'*2001), vol. II, 264–271.
[5] Debevec, P. E., Taylor, C. J., and Malik, J. 1996. Modeling and rendering architecture from photographs: A hybrid geometry- and image-based approach. *Computer Graphics (SIGGRAPH'96)* (August), 11–20.
[6] Debevec, P. E., Yu, Y., and Borshukov, G. D. 1998. Efficient view-dependent image-based rendering with projective texture-mapping. *Eurographics Rendering Workshop* 1998, 105–116.
[7] Gortler, S. J., Grzeszczuk, R., Szeliski, R., and Cohen, M. F. 1996. The Lumigraph. In *Computer Graphics (SIGGRAPH'96) Pro-ceedings*, ACM SIGGRAPH, 43–54.
[8] Hall-Holt, O., and Rusinkiewicz, S. 2001. Stripe boundary codes for real-time structured-light range scanning of moving objects. In *Eighth International Conference on Computer Vision (ICCV* 2001), vol. II, 359–366.
[9] Heigl, B., et al. 1999. Plenoptic modeling and rendering from image sequences taken by hand-held camera. In *DAGM'*99, 94–101.
[10] Kanade, T., Rander, P. W., and Narayanan, P. J. 1997. Virtualized reality: constructing virtual worlds from real scenes. *IEEE Mul-tiMedia Magazine* 1,1 (Jan–March), 34–47.
[11] Levoy, M., and Hanrahan, P. 1996. Light field rendering. In *Computer Graphics (SIGGRAPH'96) Proceedings*, ACM SIG-GRAPH, 31–42.
[12] Pulli, K., et al. 1997. View-based rendering: Visualizing real objects from scanned range and color data. In *Proceedings of the 8th Eurographics Workshop on Rendering*.
[13] Scharstein, D., and Szeliski, R. 2002. A taxonomy and evaluation of dense two-frame stereo correspondence algorithms. *International Journal of Computer Vision* 47, 1 (May), 7–42.
[14] Seitz, S. M., and Dyer, C. M. 1997. Photorealistic scene reconstruction by voxel coloring. In *Conference on Computer Vision and Pattern Recognition (CVPR'*97), 1067–1073.
[15] Shade, J., Gortler, S., He, L.-W., and Szeliski, R. 1998. Layered depth images. In *Computer Graphics (SIGGRAPH'98) Proceedings*, ACM SIGGRAPH, Orlando, 231–242.
[16] Tao, H., Sawhney, H., and Kumar, R. 2001. A global matching framework for stereo computation. In *Eighth International Conference on Computer Vision (ICCV* 2001), vol. I, 532–539.
[17] Vedula, S., Baker, S., Seitz, S., and Kanade, T. 2000. Shape and motion carving in 6D. In *Conference on Computer Vision and Pattern Recognition (CVPR'*2000), vol. II, 592–598.
[18] Yang, J. C., Everett, M., Buehler, C., and McMillan, L. 2002. A real-time distributed light field camera. In *Eurographics Workshop on Rendering*, P. Debevec and S. Gibson, Eds., 77–85.
[19] Zhang, Y., and Kambhamettu, C. 2001. On 3D scene flow and structure estimation. In *Conference on Computer Vision and Pattern Recognition (CVPR'*2001), vol. II, 778–785.
[20] Zhang, L., Curless, B., and Seitz, S. M. 2003. Spacetime stereo: Shape recovery for dynamic scenes. In *Conference on Computer Vision and Pattern Recognition*, 367–374.
[21] Zhang, Z. 2000. A flexible new technique for camera calibration. *IEEE Transactions on Pattern Analysis and Machine Intelligence* 22, 11, 1330 1334.

The invention claimed is:

1. A computer-implemented process for generating a two-layer representation of a digital or digitized image from the image and a disparity map of the image, comprising:
   a first identifying step for identifying the location of depth discontinuities in the image using its disparity map;
   a second identifying step for identifying the pixels of the image that are found within prescribed sized areas surrounding the depth discontinuities and designating these pixels as being in depth discontinuity areas of the image;
   a first estimating step for estimating a foreground and background color, and an alpha value, for each pixel in the depth discontinuity areas;
   a second estimating step for estimating a foreground and background disparity value for each pixel in the depth discontinuity areas;
   a first establishing step for establishing a boundary layer of the image comprising a pixel at each respective location that corresponds to a pixel of the depth discontinuity areas, wherein each boundary layer pixel is assigned the foreground color, foreground disparity and alpha value associated with the corresponding pixel of the depth discontinuity areas;
   a second establishing step for establishing a main layer of the image comprising,
      a pixel at each respective location that corresponds to a pixel of the depth discontinuity areas, wherein each of said pixels is assigned the background color and background disparity value associated with the corresponding pixel of the depth discontinuity areas, and
      a pixel at each location that does not correspond to a pixel of the depth discontinuity areas, wherein each of said pixels is assigned the color and disparity value associated with the corresponding pixel of the image; and
   a storage step for storing the main and boundary layers.

2. The process of claim 1, further comprising a dilating step for dilating the regions corresponding to the boundary layer pixels by a prescribed amount and an assigning step for assigning each added pixel the same color and disparity values as the corresponding pixel in the main layer, and an alpha value of 1.

3. A computer-implemented process for generating a two-layer representation of a digital or digitized image from the image and a pixel depth map of the image, comprising:
   a first identifying step for identifying the location of depth discontinuities in the image using its depth map,
   a second identifying step for identifying the pixels of the image that are found within prescribed sized areas surrounding the depth discontinuities and designating these pixels as being in depth discontinuity areas of the image,
   a first estimating step for estimating a foreground and background color, and an alpha value, for each pixel in the depth discontinuity areas,
   a second estimating step for estimating a foreground and background depth value for each pixel in the depth discontinuity areas, and a generating step for generating a main layer of the image comprising pixels exhibiting the background colors and background depths associated with correspondingly located pixels of the depth discontinuity areas as well as pixels exhibiting the colors and depths associated with the correspondingly located pixels of the image not found in the depth discontinuity areas, and a boundary layer of the image comprising pixels exhibiting the foreground colors, foreground depths and alpha values associated with the correspondingly located pixels of the depth discontinuity areas; and a storage step for storing the main and boundary layers.

4. A computer-implemented process for generating a two-layer representation of a digital or digitized image from the image and a pixel disparity map of the image, comprising:

an identifying step for identifying the location of depth discontinuities in the image using its disparity map;

an establishing step for establishing prescribed sized depth discontinuity areas surrounding the identified depth discontinuities;

a first estimating step for estimating a foreground and background color, and an alpha value, for each pixel in the depth discontinuity areas;

a second estimating step for estimating a foreground and background disparity value for each pixel in the depth discontinuity areas;

a generating step for generating a main layer of the image comprising pixels exhibiting the background colors and background disparities associated with correspondingly located pixels of the depth discontinuity areas as well as pixels exhibiting the colors and disparities associated with the correspondingly located pixels of the image not found in the depth discontinuity areas, and a boundary layer of the image comprising pixels exhibiting the foreground colors, foreground disparities and alpha values associated with the correspondingly located pixels of the depth discontinuity areas; and a storage step for storing the main and boundary layers.

* * * * *